(12) United States Patent
Ulasen et al.

(10) Patent No.: US 12,124,574 B2
(45) Date of Patent: Oct. 22, 2024

(54) SYSTEM AND METHOD OF SYNTHESIZING POTENTIAL MALWARE FOR PREDICTING A CYBERATTACK

(71) Applicant: Acronis International GmbH, Schaffhausen (CH)

(72) Inventors: Sergey Ulasen, Singapore (RU); Vladimir Strogov, Schaffhausen (SG); Serguei Beloussov, Schaffhausen (SG); Stanislav Protasov, Schaffhausen (SG)

(73) Assignee: Acronis International GmbH, Schaffhausen (CH)

( * ) Notice: Subject to any disclaimer, the term of this patent is extended or adjusted under 35 U.S.C. 154(b) by 318 days.

(21) Appl. No.: 17/646,127

(22) Filed: Dec. 27, 2021

(65) Prior Publication Data

US 2023/0205877 A1 Jun. 29, 2023

(51) Int. Cl.
*G06F 21/56* (2013.01)
*G06V 30/19* (2022.01)

(52) U.S. Cl.
CPC ........ *G06F 21/56* (2013.01); *G06V 30/19147* (2022.01); *G06V 30/19173* (2022.01)

(58) Field of Classification Search
CPC ...... G06F 21/56; G06F 21/561; G06F 21/566; G06F 21/562; G06V 30/19147; G06V 30/19173; G06N 20/00
See application file for complete search history.

(56) References Cited

U.S. PATENT DOCUMENTS

| | | | |
|---|---|---|---|
| 9,992,211 B1 | 6/2018 | Viljoen et al. | |
| 10,841,333 B2 | 11/2020 | Levy | |
| 10,917,421 B2 | 2/2021 | Bartos et al. | |
| 10,917,435 B2 | 2/2021 | Stupak et al. | |
| 11,055,411 B2 | 7/2021 | Strogov et al. | |
| 11,481,492 B2* | 10/2022 | Tsao | H04L 63/1425 |
| 2012/0260342 A1* | 10/2012 | Dube | G06F 21/564 726/24 |
| 2016/0335435 A1* | 11/2016 | Schmidtler | G06N 20/00 |
| 2017/0083703 A1 | 3/2017 | Abbasi et al. | |
| 2019/0034632 A1 | 1/2019 | Tsao et al. | |
| 2020/0082083 A1 | 3/2020 | Choi et al. | |
| 2020/0111019 A1 | 4/2020 | Goodsitt et al. | |
| 2022/0201012 A1 | 6/2022 | Grebennikov et al. | |

FOREIGN PATENT DOCUMENTS

| | | |
|---|---|---|
| CN | 108304721 | 7/2018 |
| CN | 112560034 | 3/2021 |

* cited by examiner

*Primary Examiner* — Baotran N To
(74) *Attorney, Agent, or Firm* — ESPE Legal Consultancy FZ-LLC

(57) ABSTRACT

A system and method for malware classification using machine learning models trained using synthesized feature sets based on features extracted from samples of known malicious objects and known safe objects. The synthesized feature sets act as virtual samples for training a machine learning classifier to recognize new objects in the wild that are likely to be malicious.

13 Claims, 8 Drawing Sheets

SYSTEM AND METHOD OF SYNTHESIZING POTENTIAL MALWARE FOR PREDICTING A CYBERATTACK

FIELD OF THE INVENTION

The invention pertains to the field of computer security, in particular the analysis and prediction of malicious behavior by computer programs and files.

BACKGROUND OF THE INVENTION

Machine learning models for malware detection are often trained using known samples. For example, the known samples comprise datasets with labels. These samples are taken from different sources. As a result, the sample datasets describe the objects that contain the threat, but do not include metadata that could be useful. For example, where the dataset comprises malicious files, such metadata could reveal how the malicious file got into the affected computer system. Moreover, the malicious file might be only a derivative of some other program or file. Or the malicious file could be a part of a broad distributed attack system.

When training a machine learning model using the features obtained from a typical dataset, there are cases where the model cannot correctly classify an object by its attributes. Even though the object contains a threat, the object will not be classified correctly because there is not enough data in the dataset that characterizes such objects.

Another problem comes from attackers who automate the process of creating malware and combine various modules for encryption, obfuscation, and exploitation of vulnerabilities. Such malware may use different command centers for communication. Or the malware may exploit unusual ways of hiding in the system. Hence, malicious files, web pages, network packets and other system objects that carry the same malicious functionality can be missed by the protection system. This is because these objects will have a different set of attributes than what a machine learning model would predict based on known malware.

Current methods for working with combined data for machine learning and deep learning models aim at improving the quality of object classification. But these methods may not be effective for detecting malicious objects. The combined data remains a random set of attributes even though it has been derived from the data available in the dataset. This approach will improve the quality of training a machine learning model to identify malware. But at the same time, it will introduce an increase in false positives. Randomly synthesized data may correspond to legitimate software and its resources. For example, all the attributes corresponding to the known samples of ransomware may be taken and the data synthesized by filling the sets of attributes with random data or data that, in principle, can occur in real systems. In this case, some of the records in the dataset will correspond to legitimate software. Examples of such software include an agent file system encryption, DLP agents, and file synchronization agents.

Known technologies do not effectively predict the emergence of new threats. They focus instead on improving the accuracy of the machine learning model for a specific class of objects. Searching for universal rules for detecting new instances of malicious files and programs risks increasing false positives. New systems and methods are needed to prevent increasingly sophisticated malware attacks while at the same time avoiding these false positives.

SUMMARY OF THE INVENTION

Potential malware files, programs, and modules are predicted in advance by machine learning classification. Classification is achieved by analyzing the parameters and behavior of known malicious programs. The invention predicts the appearance of new, previously unknown threats and increases the level of detection while reducing the level of false positives. This result is achieved by synthesizing new records in the machine learning dataset. These new, synthetic records improve the quality of model training and improve the model's ability to determine the class of malware and detect previously unknown threats more accurately.

Implementation of a method embodying the invention comprises collecting known malware samples. The dynamic (behavioral) characteristics and static characteristics are described separately for each file. Both types of parameters are combined into a single table. Machine learning algorithms are then used to create synthetic models for the potential malware. These tables and models comprise a kind of virtual sample, which are used to train a model that will more accurately classify real malicious objects found in the wilds.

A feature of the invention is data synthesis. Synthesized data sets improve a machine learning model's accuracy in the detection of new threats. Synthesis in this context means combining the attributes of known threats with logic that creates new feature vectors that will better correspond to unknown samples. At the same time, the synthesized datasets are more likely to correspond to the threat model for certain classes of threats and while reducing noise that increases false positives.

Several embodiments of the invention can be used to implement this approach. First, the attributes of known threats can be synthesized while filtering out vectors derived from datasets of known safe objects. A second method builds a sample of vectors corresponding to a certain class of malicious objects and mixes attributes in this sample in various ways. For example, the class and the selection are formed according to the key attributes of static analysis and all the attributes of this selection are mixed, including dynamic attributes. Or the class and the selection are formed according to behavioral logs, which record types of behavior. All the attributes of this selection are mixed, including attributes. A third method combines synthesizing attributes and filtering out known safe vectors for a specific class and sample.

DETAILED DESCRIPTION

The invention comprises a system and method for training and using machine learning malware classification models. Synthetic datasets are created and used for training a machine learning malware classifier. These synthetic datasets improve the ability of machine learning models to accurately detect and classify malware. These synthetic datasets act as virtual samples that allow machine learning classifiers to be trained to detect previously unknown malware. The invention improves machine learning malware classifiers by increasing classification accuracy and reducing false positives. Increased accuracy by a malware classifier improves the efficiency of a computer system by protecting them from new malware threats while reducing false positives ensures the usefulness of the computer system for its intended tasks. The improved malware classifier can also be used for penetration testing. Synthetic malware datasets can be used to create hypothetical "new" malware objects for testing purposes. These new objects can be used to test the detection capabilities of existing computer security systems to rate the In the context of machine learning, a feature is an input variable used in making predictions or classifications in machine learning. Feature engineering is the process of determining which features might be useful in training a machine learning model, and then converting raw data from log files and other sources into those features. Feature extraction aims to reduce the number of features in a dataset by creating new features from the existing ones (and then discarding the original features).

Malicious processes in computer systems can be detected using dynamic analysis and static analysis. Dynamic analysis, also called "behavior analysis," focuses on how an untrusted file or process acts. Static analysis, on the other hand, is concerned with what can be known about an untrusted file or process before runtime.

Figure 1:
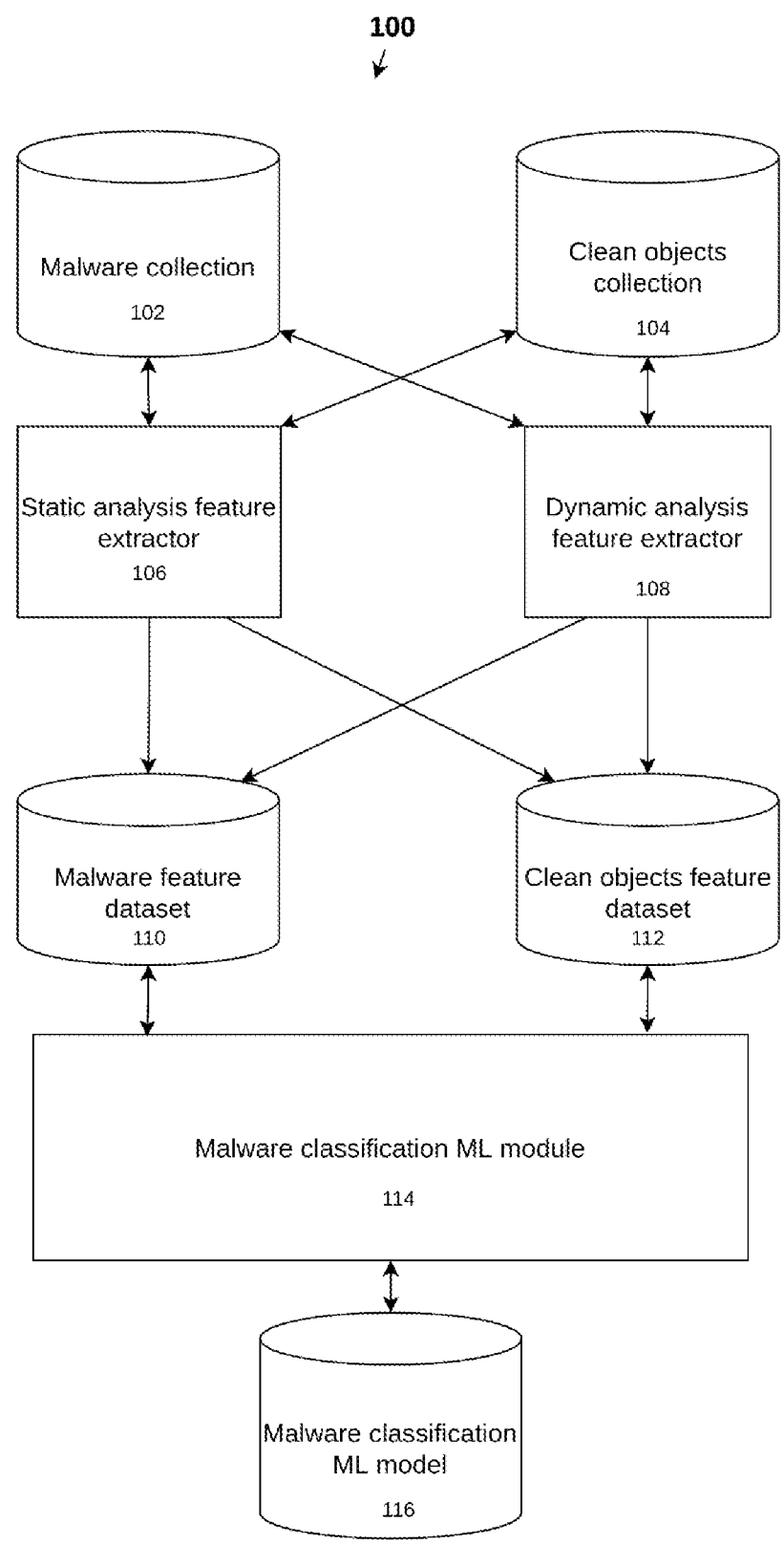
FIG. 1 shows a system for training a machine learning malware classification model.

FIG. 1 shows how the machine learning classification model is trained by extracting static and dynamic features from a malware collection and a clean objects collection. The system 100 comprises malware collection 102 and clean objects collection 104. These collections 102, 104 communicate with static analysis feature extractor 106 and dynamic analysis feature extractor 108. In turn, static analysis feature extractor 106 and dynamic analysis feature extractor 108 pass extracted dataset features to malware feature dataset 110 and clean objects feature dataset 112. These datasets 110, 112 interact with malware classification machine learning module 114.

Module 114 comprises a file with functions for training malware classification machine learning model 116. For example, in a Python environment, module 114 contains variables of different types, such as arrays, dictionaries, objects, and is saved in a file with the .py extension.

Machine learning model 116 is a file that has been trained to recognize certain types of patterns in a given dataset. Pattern recognition is achieved by way of functions and algorithms provided by module 114.

Figure 2:
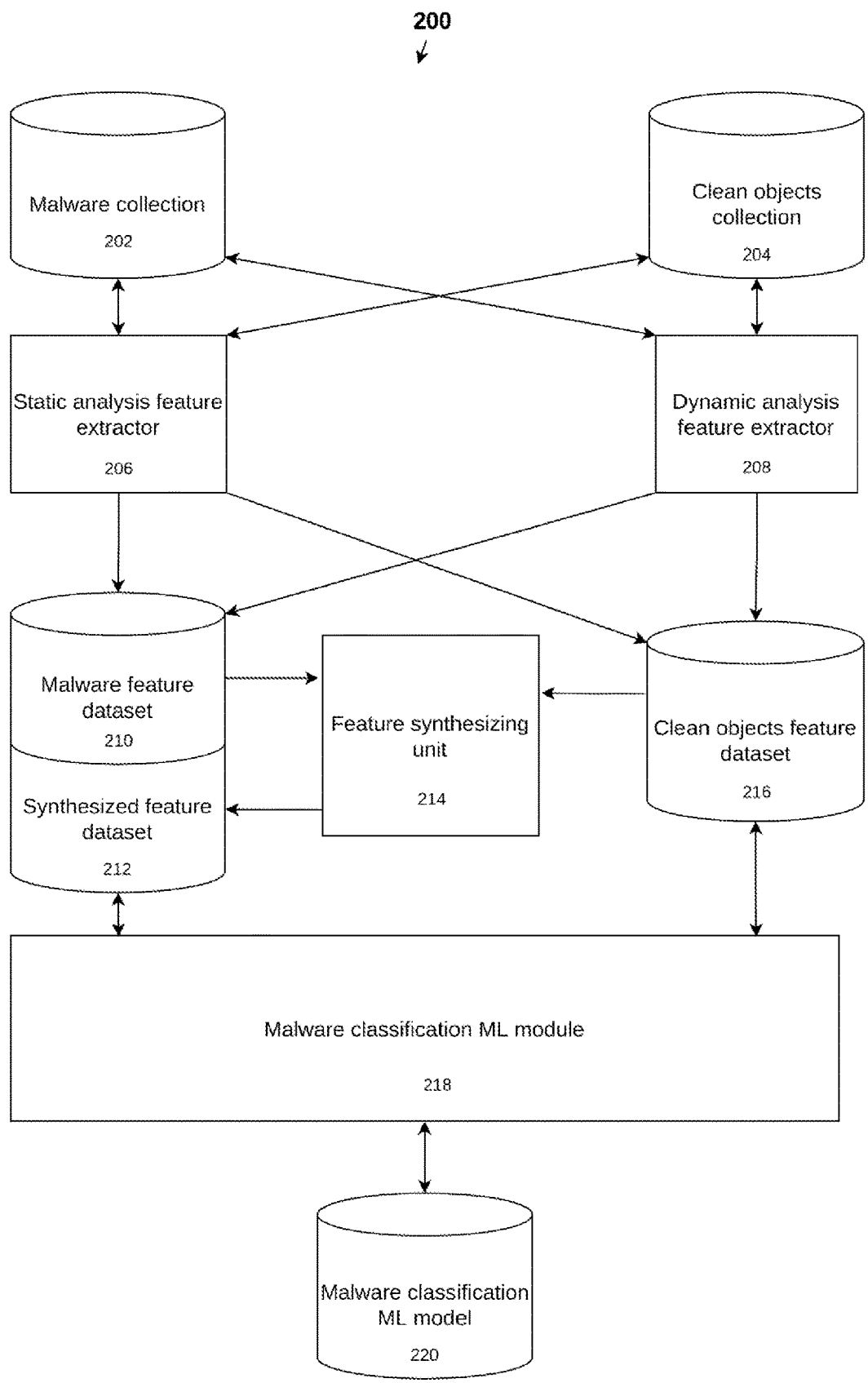
FIG. 2 shows the system for training a machine learning malware classification model like FIG. 1 but with additional details related to feature synthesis.

The system of FIG. 2 resembles FIG. 1 but shows additional details related to feature synthesis, including a feature synthesizing unit and a synthesized feature dataset. System 200 comprises malware collection 202 and clean objects collection 204. These collections communicate with static analysis and dynamic analysis feature extractors 206, 208.

Feature synthesis is accomplished through the interaction of malware feature dataset 210, synthesized feature dataset 212, feature synthesizing unit 214, and clean objects feature dataset 216. The extractors 206, 208 pass extracted dataset features to both malware feature dataset 210 and clean objects feature dataset 216. Feature synthesizing unit 214 is passed feature data from malware feature dataset 210 and clean objects feature dataset 216. Feature synthesizing unit 214 mixes features from datasets 210 and 216 and passes the resulting mixed features to synthesized feature dataset 212.

Malware classification machine learning module 218 comprises a file with functions for training malware classification machine learning model 220. For example, in a Python environment, module 218 contains variables of different types, such as arrays, dictionaries, objects, and is saved in a file with the .py extension.

Machine learning model 220 is a file that has been trained to recognize certain types of patterns in a given dataset. Pattern recognition is achieved by way of functions and algorithms provided by module 218. In this configuration, module 218 is passed a synthesized feature dataset 212 and a clean objects feature dataset. Thus, model 220 is trained from "virtual" malware data rather than from known malware samples.

Figure 3:
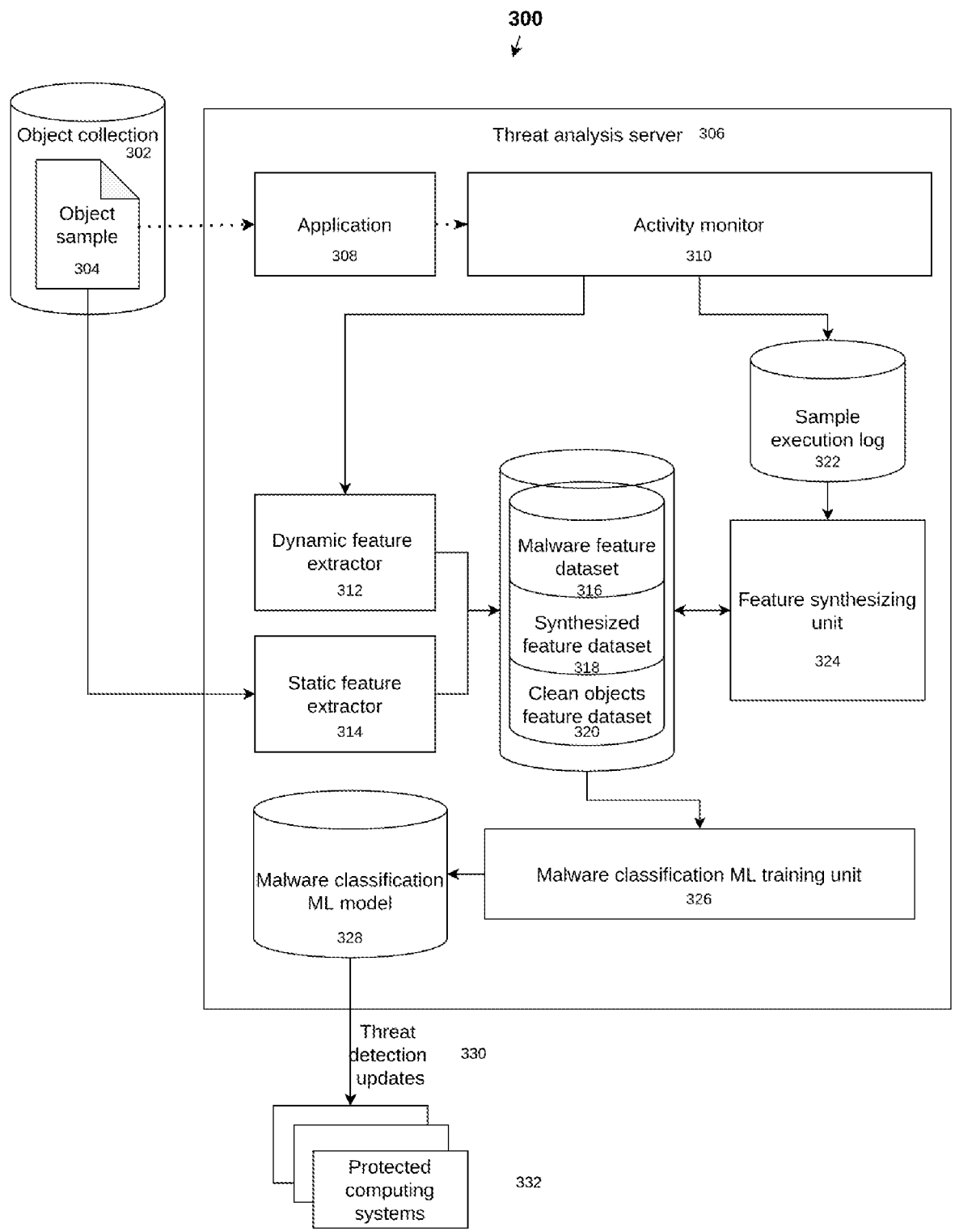
FIG. 3 shows a system for static and dynamic analysis of object samples.

FIG. 3 shows system 300 for static and dynamic analysis of an object collection 302 comprising object samples 304. Threat analysis server 306 is configured for dynamic analysis of sample 304 by way of running the sample as application 308. Activity monitor 310 records information about the activity of application 308 during runtime. Monitor 310 passes features identified during runtime to dynamic feature extractor 312. Object sample 304 is also passed to static feature extractor 314 for static feature extraction. The static and dynamic feature extractors 312, 314 pass extracted features to malware feature dataset 316, synthesized feature dataset 318, and clean objects feature dataset 320. Extracted static and dynamic features are passed to malware feature dataset 316 or clean objects feature dataset 320 depending on the nature of object collection 302 from which sample 304 was obtained.

Activity monitor 310 also passes features identified during runtime to sample execution log 322. Log data from execution log 322 is then passed to feature synthesizing unit 324. Feature synthesizing unit 324 interacts with the malware, synthesized, and clean objects feature datasets 316, 318, and 320. The mixing of features among various feature datasets, such as malware, synthesized, and clean objects feature datasets 316, 318, and 320, is shown in detail in FIGS. 4 and 5.

The output of the mixed datasets 316, 318, and 320 is passed to malware classification machine learning training unit 326, which trains malware classification machine learning model 328. In an embodiment, malware classification machine learning model 328 passes threat detection updates 330 to protected computer systems 332.

Figure 4:
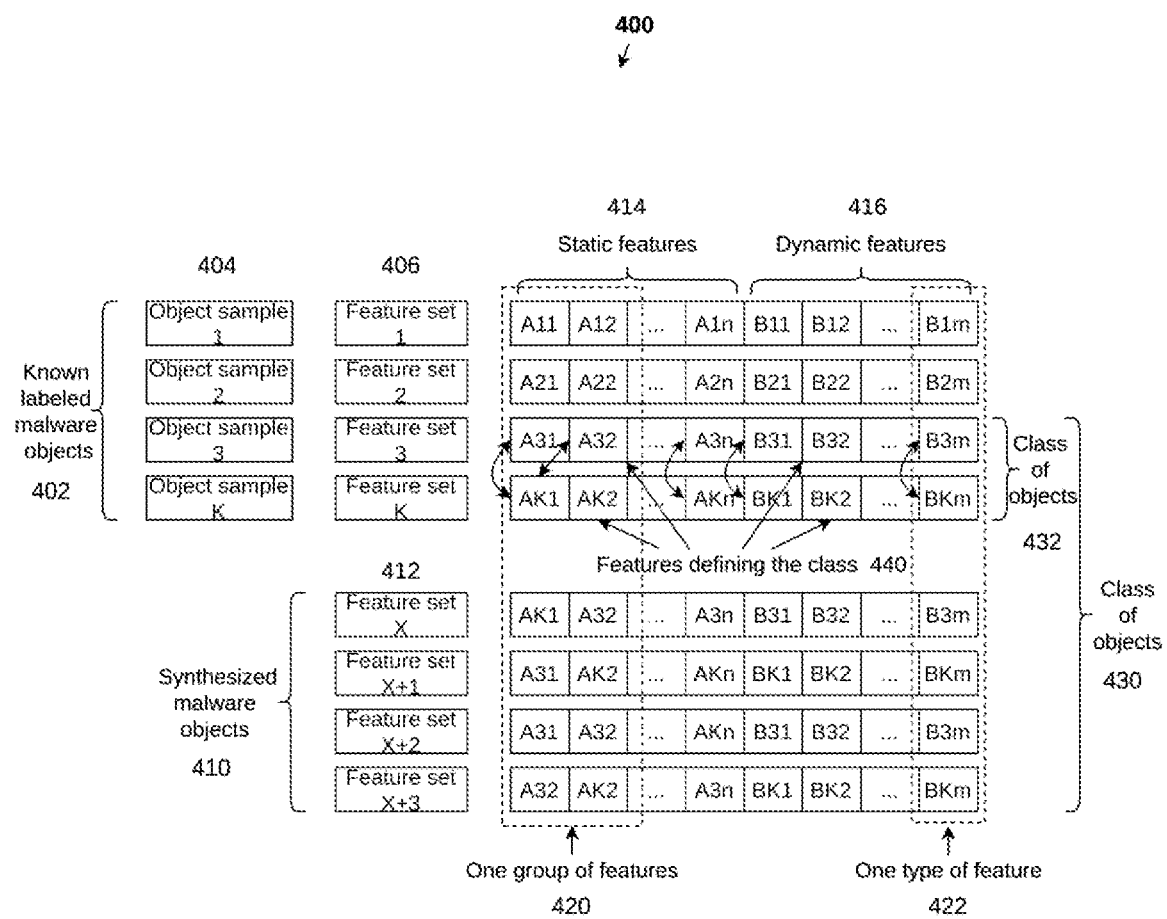
FIG. 4 shows an example of building a sample of vectors corresponding to a certain class of malicious objects where the attributes of the sample are mixed.

FIG. 4 shows example 400 of building synthetic feature vectors corresponding to a certain class of malicious objects where the attributes of the sample are mixed. A feature vector is the list of feature values representing a row of a dataset. Known labeled malware objects 402 include object samples 1, 2, 3, . . . K (404). These object samples include feature sets 1, 2, 3, . . . K (406) and the feature sets are used to create synthesized malware objects 410 comprising feature sets x, x+1, x+2, and x+3 (412). Static features 414 are represented by the prefix A and Dynamic features 416 are represented by the prefix B. For example, feature set 1 (406) comprises a given number of static features A11, A12, . . . A1n and a given number of dynamic features B11, B12, . . . B1m. Feature set 2 (406) likewise comprises static features A21, A22, . . . A2n and dynamic features B21, B22, . . . B2m. Feature sets 3 through K (406) follow this pattern, where the last static feature is represented by n and the last dynamic feature is represented by m.

Synthesized feature sets x, x+1, x+2, and x+3 (412) comprise mixed static and dynamic features taken from the static features 414 and dynamic features 416 from feature sets 3 and K. For example, feature set x (412) comprises static features AK1, A32, . . . A3n and dynamic features B31, B32, . . . B3m.

Static features 414 and dynamic features 416 are divided into one group of features 420 and one type of feature 422. A group of features comprises, for example, stack traces, API calls sequences, operations with files, or operations with a register or network. Or group features may include file modifications or reading files. Feature sets 3 and K (406) and features sets x through x+3 (412) comprise an object class 430 of features from known labeled malware objects and synthesized malware objects. The static features and dynamic features found in the known labeled malware objects 402 in feature sets 3 and K (432) comprise object class 432. Class-defining features 440 are the features in object class 432 that are mixed and used to populate the static and dynamic features for synthetic feature sets x, x+1, x+2, and x+3.

Figure 5:
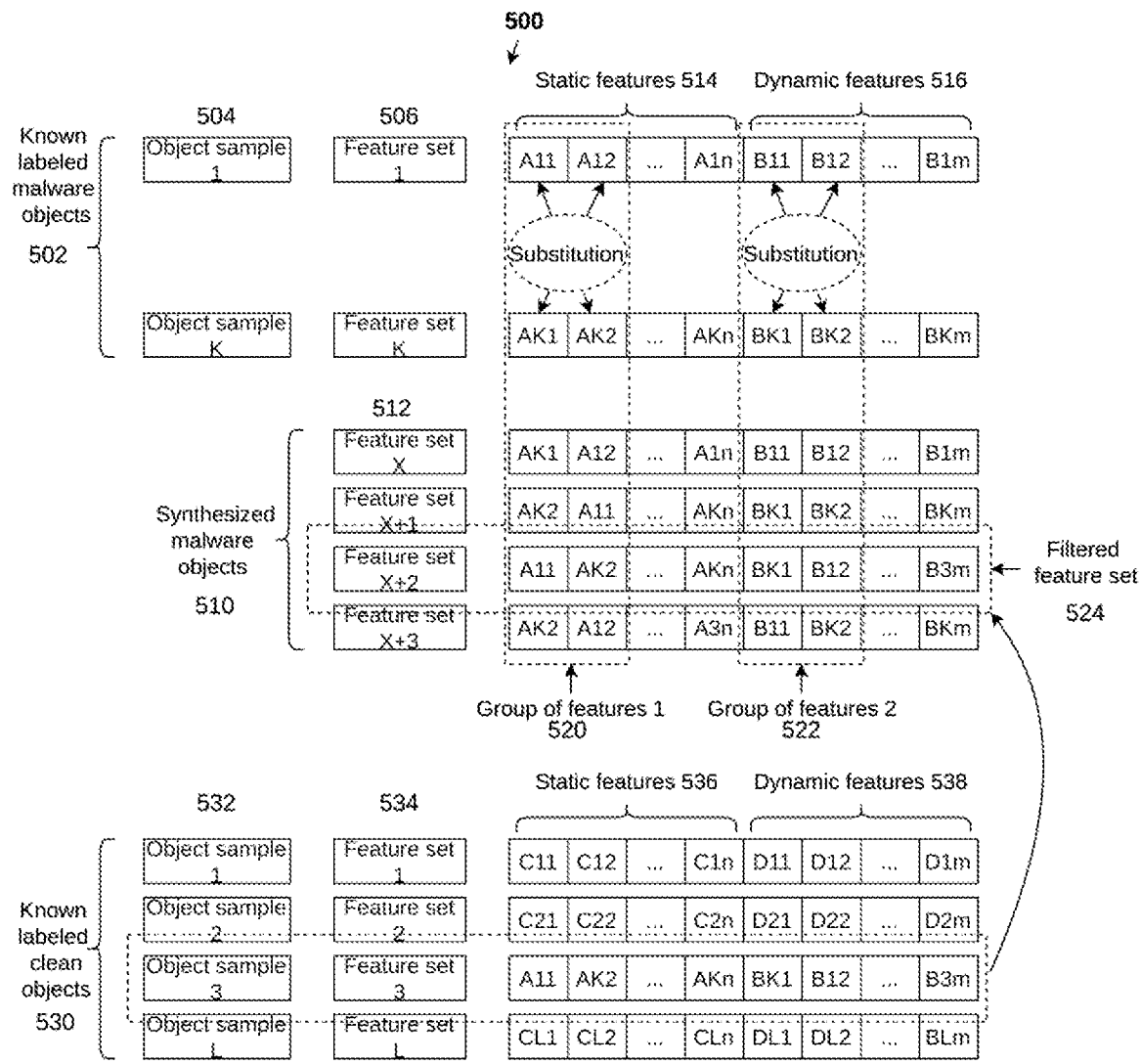
FIG. 5 shows an example of building a sample of vectors including a filtered feature set and feature substitution.

FIG. 5 shows example 500 of using known labeled malware objects and known labeled clean objects to create synthesized malware objects. Known malware objects 502 include object samples 1-K (504) with corresponding feature sets 1-K (406). Synthesized malware objects 510 with corresponding feature sets x, x+1, x+2, and x+3 (512). Feature sets 506 and 512 comprise static features 514 and dynamic features 516. The static and dynamic features 514, 516 in feature sets 1-K (506) and feature sets 512 are grouped into a first feature group 520 and a second feature group 522. These groups 520, 522 are used as parameters for feature substitution. For example, features within first group 520 and second group 522 are substituted for other static and dynamic features in the same group. In the example shown in FIG. 5, the substituted static features are A11 with AK2 and AK1 with A12. The substituted dynamic features are B11 with BK2 and BK1 with B12. These substitutions take place between features sets 1 and K (512).

A filtered feature set 524 corresponding to feature set x+2 (512) is defined in relation to known labeled clean objects 530. These known labeled clean objects 530 have corresponding feature sets 1, 2, 3, . . . L (534). Features sets 1-L comprise static features 536 and dynamic features 538. Static features 536 are labeled C11, C12, . . . C1n and D11, D12, . . . D1m for feature set 1. For feature set 2, the static features are C21, C22, . . . C2n and the dynamic features are D21, D22, . . . D2m. Feature set 3 has static features A11, AK2, . . . AKn and dynamic features BK1, B12, . . . B3m. This feature set—A11, AK2, . . . AKn and BK1, B12, . . . B3m—also appears in synthesized malware objects feature set x+2 where it is identified as filtered feature set 524.

Figure 6:
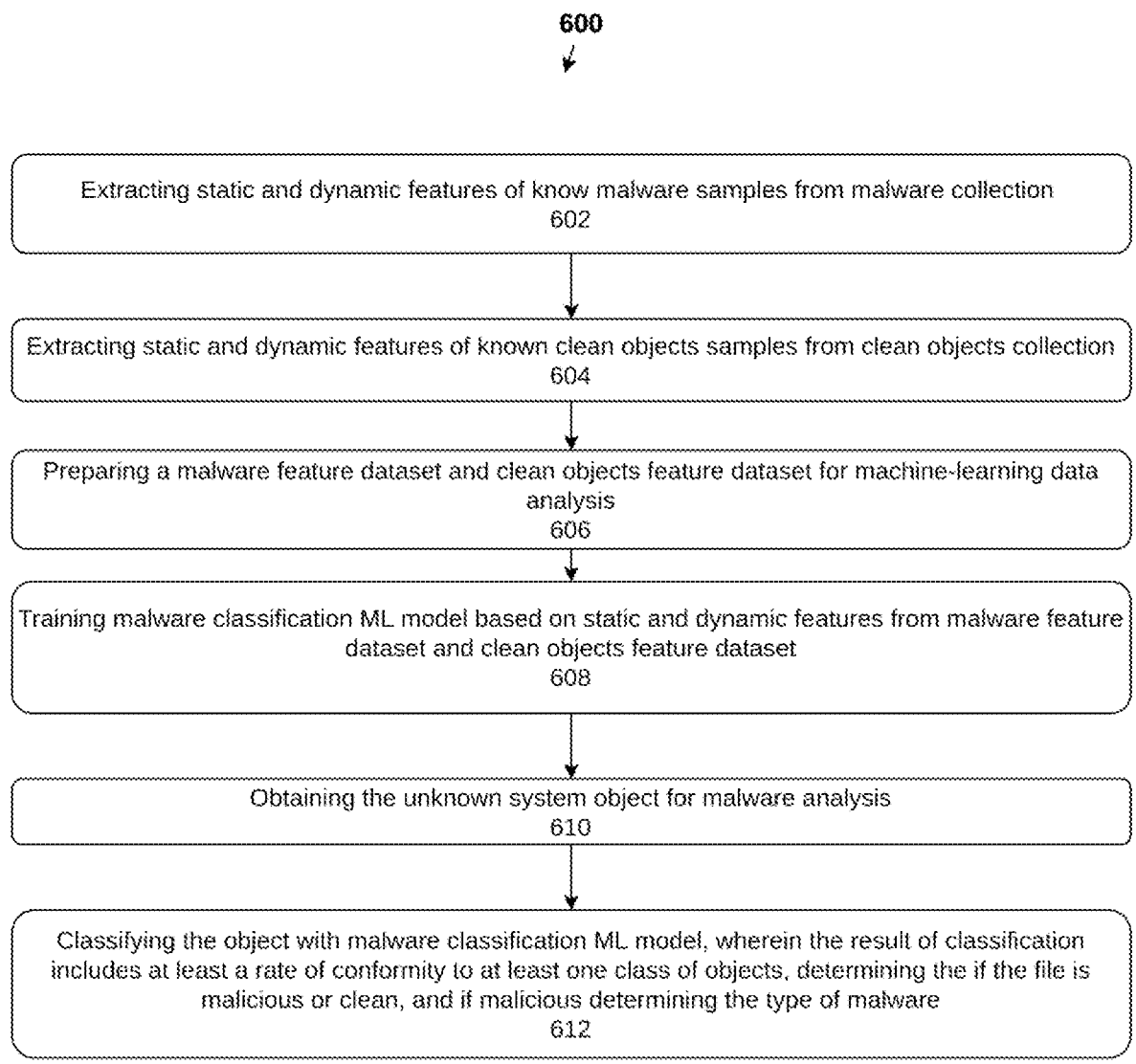
FIG. 6 shows a method of training a malware classification machine learning model and classifying malware by synthesizing feature sets from malware and clean collections.

FIG. 6 shows a method 600 for training a malware classification machine learning model and classifying malware by synthesizing feature sets from malware and clean collections. At step 602 static and dynamic features are extracted from known malware samples from a malware collection. Then at step 604 static and dynamic features are extracted from known clean object samples from a clean objects collection. At step 606, a malware feature dataset and a clean objects feature dataset are prepared for machine learning analysis. A malware classification machine learning model is trained at step 608 based on static and dynamic features from the malware feature dataset and the clean objects feature dataset. An unknown system object for malware analysis is obtained at step 610. The object is then classified with the malware classification machine learning model at step 612. The result of the classification includes one or more of the following: determining a rate of conformity to at least one class of objects, determining if the file is malicious or clean, and determining malware type if malicious.

Figure 7:
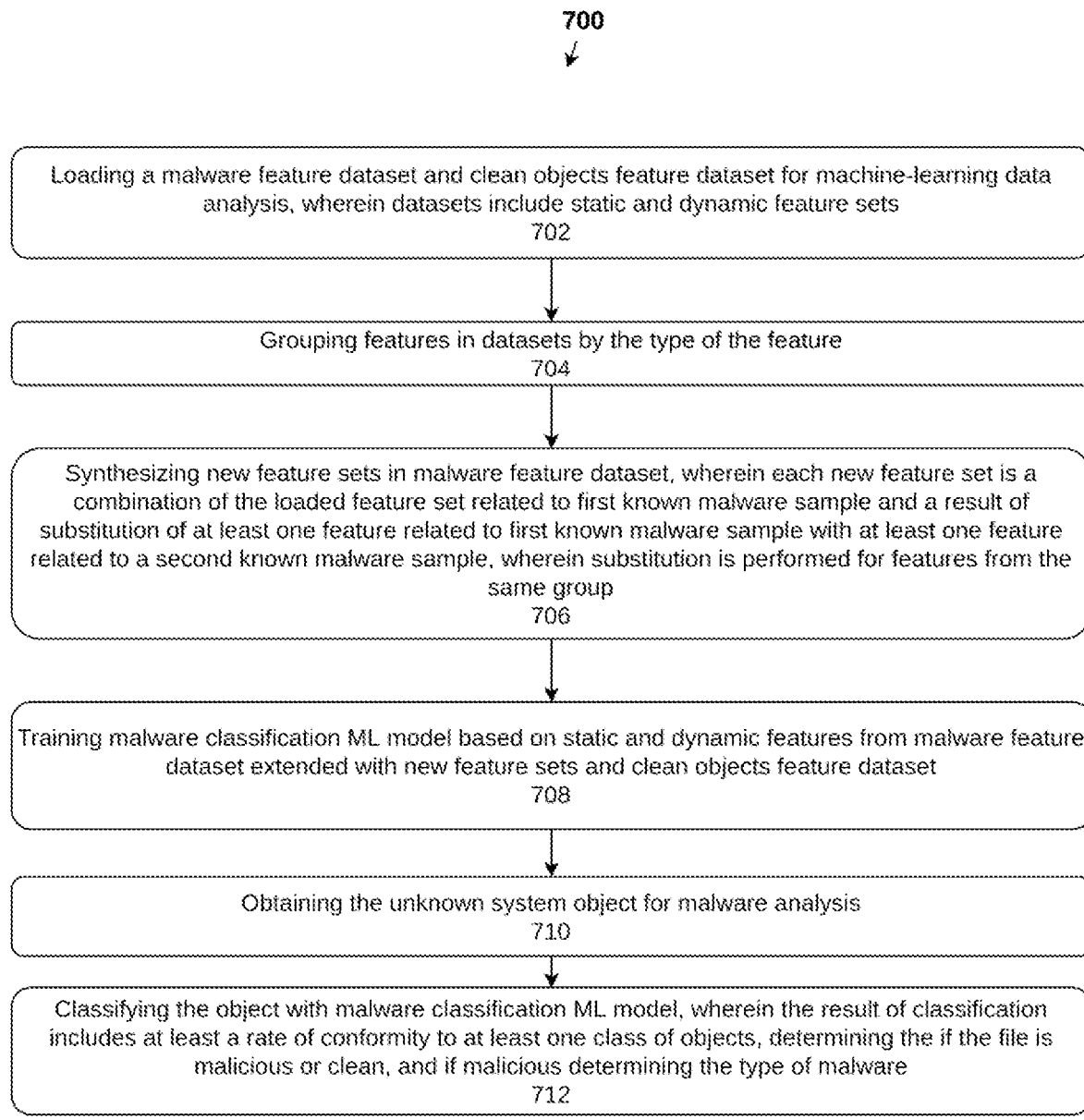
FIG. 7 shows a method of training a malware classification machine learning model and classifying malware by creating a synthesized dataset from static and dynamic features, where the features in the datasets are grouped by feature type.

FIG. 7 shows a method 700 of training a malware classification machine learning model and classifying malware by creating a synthesized dataset from static and dynamic features. A malware feature dataset and a clean objects feature data set are loaded for machine-learning data analysis at step 702. The loaded datasets include static and dynamic feature sets. At step 704, the features in these datasets are grouped by feature type. Then new feature sets are synthesized in a malware feature dataset at step 706. Each new feature set is a combination of the loaded feature set related to a first known malware sample and a result of substitution of at least one feature related to the first known malware sample with at least one feature related to a second malware sample. The substitution is preferably performed for features from the same group. The training of a malware machine learning model takes place at step 708. Static and dynamic features from the malware feature dataset extended with new, synthesized feature sets and the clean objects dataset. At step 710 an unknown system object is obtained for malware analysis. The object is classified with the trained malware classification machine learning model at step 712. The result of classification includes at least one of the following: determining a rate of conformity to at least one class of objects, determining if the file is malicious or clean, and determining the type of malware if the file is malicious.

Figure 8:
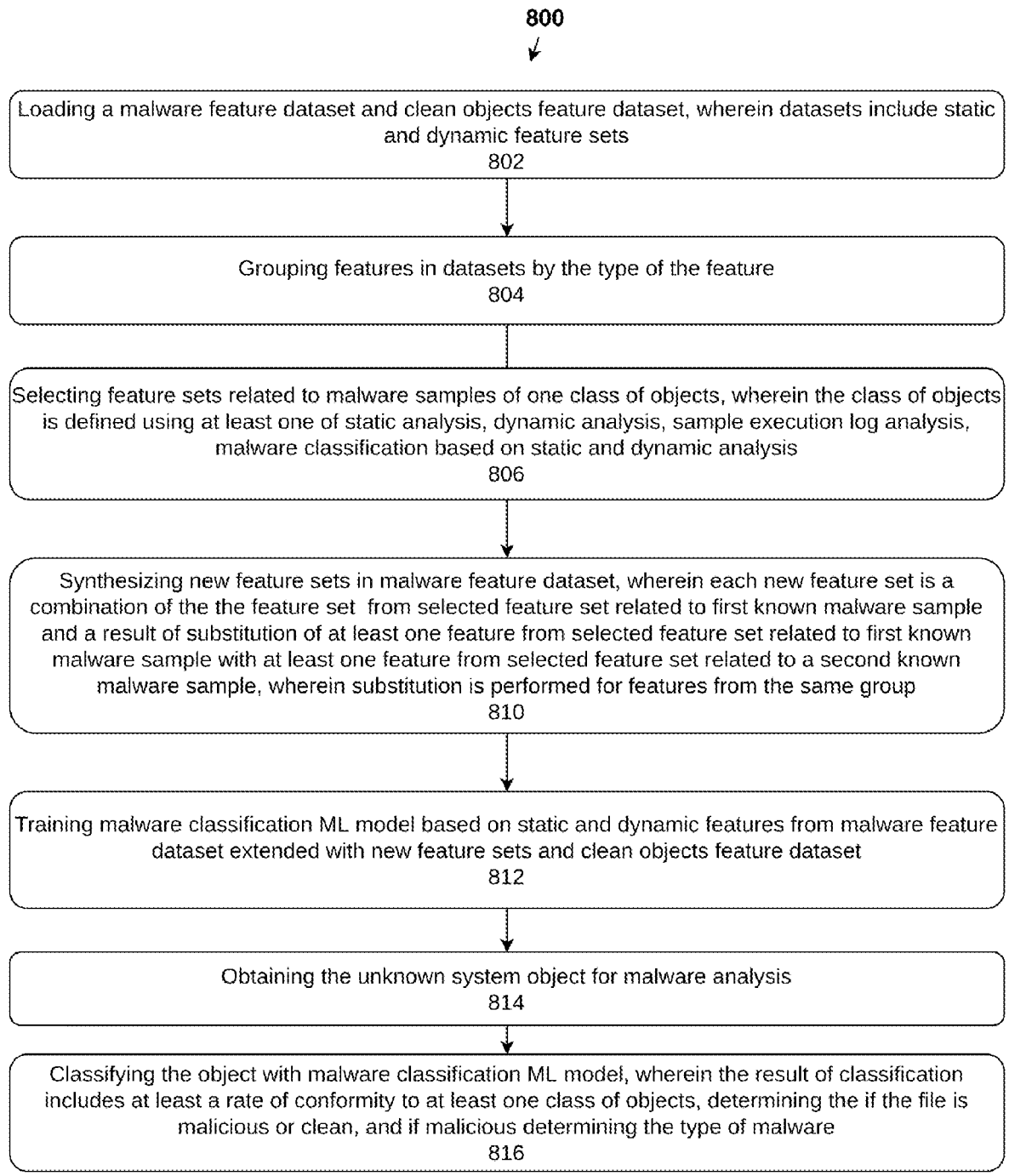
FIG. 8 shows a method of training a malware classification machine learning model and classifying malware by creating a synthesized dataset from selected features related to malware samples of one class of objects.

FIG. 8 shows a method 800 of training a malware classification machine learning model and classifying malware by creating a synthesized dataset from selected features related to malware samples of one class of objects. A malware feature dataset and a clean objects feature data set are loaded for machine-learning data analysis at step 802. The loaded datasets include static and dynamic feature sets. At step 804, the features in these datasets are grouped by feature type. Feature sets are selected related to malware samples of one class of objects at step 806. The class of objects is defined using at least one of static analysis, dynamic analysis, sample execution log analysis, and malware classification based on static and dynamic analysis. Then new feature sets are synthesized in a malware feature dataset at step 810.

Each new feature set is a combination of the selected feature set related to a first known malware sample and a result of substitution of at least one feature related to the first known malware sample with at least one feature related to a second malware sample. The substitution is preferably performed for features from the same group. The training of a malware machine learning model takes place at step 812. Static and dynamic features from the malware feature dataset extended with new feature sets and the clean objects dataset. At step 814 an unknown system object is obtained for malware analysis. The object is classified with the trained malware classification machine learning model at step 816. The result of classification includes at least one of the following: determining a rate of conformity to at least one class of objects, determining if the file is malicious or clean, and determining the type of malware if the file is malicious.

The invention claimed is:

1. A method for malware detection in a computer system comprising the following steps:
   extracting static and dynamic features of a known malware sample;
   extracting static and dynamic features of a known clean object sample;
   preparing a synthetic malware feature dataset and a clean objects feature dataset by grouping features in datasets by the type of feature; and
   synthesizing new feature sets in the synthetic malware feature dataset,
   wherein each new feature set is a combination of the extracted feature sets related to a first known malware sample and the result of a substitution of at least one feature related to a first known malware sample with a least one feature related to a second known malware sample;
   training a malware classification machine learning model based on the synthetic malware feature dataset and the clean objects feature dataset;
   obtaining an unknown system object for malware analysis; and
   classifying the unknown system object, wherein the result of classification includes one or more of the following: a rate of conformity with at least one class of objects, a determination if the file is malicious or not, and a determination of malware type.

2. The method of claim 1, wherein the substitution of at least one feature is performed for features from the same group.

3. The method of claim 2, wherein the step of synthesizing new feature sets further comprises the step of selecting feature sets related to malware samples of one class of objects.

4. The method of claim 3, wherein the one class of objects is defined using at least one of static analysis, dynamic analysis, sample execution log analysis, and malware classification based on static and dynamic analysis.

5. The method of claim 4, wherein the step of synthesizing new feature sets in the malware feature dataset further comprises filtering out features corresponding to known clean object samples.

6. A system for malware detection in a networked computer system comprising:
   a microprocessor, coupled with a first nontransitory storage medium;
   a known malware sample comprising a plurality of features;
   a known clean object sample comprising a plurality of features;
   a first software module, under program control of the microprocessor,
   configured for static and dynamic feature extraction by identifying vectors of the plurality of features in the known malware sample;
   a second software module, under program control of the microprocessor, configured for static and dynamic feature extraction by identifying vectors of the plurality of features of a known clean object sample;
   a synthetic malware feature dataset and a clean objects feature dataset coupled to a second nontransitory storage medium, prepared from the features extracted by the static and dynamic feature extractors;
   a malware classification machine learning model, under program control of the microprocessor, trained on the synthetic malware feature dataset and the clean objects feature dataset;
   wherein the synthetic malware feature dataset and clean objects feature dataset includes grouped features in datasets by the type of feature;
   wherein the synthetic malware feature dataset and clean objects feature dataset includes grouped features in datasets by the type of feature; and
   wherein the synthetic malware feature dataset is a combination of the extracted feature sets related to a first known malware sample and the result of a substitution of at least one feature related to a first known malware sample with a least one feature related to a second known malware sample.

7. The system of claim 6, wherein the substitution of at least one feature is performed for features from the same group.

8. The system of claim 7, wherein the synthetic malware dataset comprises feature sets related to malware samples of one class of objects.

9. The system of claim 8, wherein the one class of objects is defined using at least one of static analysis, dynamic analysis, sample execution log analysis, and malware classification based on static and dynamic analysis.

10. The system of claim 9, wherein the synthetic malware feature dataset has been filtered to remove feature vectors corresponding to known clean object samples.

11. A method for malware detection in a computer system, the method comprising:
    loading a malware feature dataset and a clean objects feature dataset,
    wherein the datasets include static and dynamic feature sets;
    grouping features in datasets by the type of features;
    selecting feature sets related to malware samples of one class of objects;
    synthesizing new feature sets in the malware feature dataset;
    training a malware classification machine learning model based on the static and dynamic features from the malware feature dataset extended with the new feature sets and the clean objects feature dataset;
    preparing a synthetic malware feature dataset and a clean objects feature dataset;
    obtaining an unknown system object for malware analysis; and
    classifying the unknown system object, wherein the result of classification includes one or more of the following: a rate of conformity with at least one class of objects, a determination if the file is malicious or not, and a determination of malware type;

wherein the one class of objects is defined using at least one of static analysis, dynamic analysis, sample execution log analysis, and malware classification based on static and dynamic analysis; and wherein each new feature set is a combination of the feature set from a selected feature set related to a first known malware sample and a result of substitution of at least one feature from the selected feature set related to the first known malware sample with at least one feature from the selected feature set related to a second known malware sample.

12. The method of claim 11, wherein the substitution of at least one feature is performed for features from the same group.

13. The method of claim 11, wherein the step of synthesizing new feature sets further comprises filtering out features corresponding to known clean object samples.

* * * * *